US006987640B2

(12) United States Patent
Tsang et al.

(10) Patent No.: US 6,987,640 B2
(45) Date of Patent: Jan. 17, 2006

(54) TWO-PART FLOW CONDITIONING APPARATUS FOR A DISC DRIVE

(75) Inventors: Alan Hing-Bun Tsang, Minneapolis, MN (US); James Eiji Kaneko, Oakdale, MN (US); Srinivas Tadepalli, Eden Prairie, MN (US); Cory Bert Welscher, Belle Plaine, MN (US); Narintr Narisaranukul, Bloomington, MN (US); Blaine Thomas Peterson, Bloomington, MN (US); Carl Fred Adams, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/228,425

(22) Filed: Aug. 27, 2002

(65) Prior Publication Data

US 2002/0196581 A1 Dec. 26, 2002

Related U.S. Application Data

(63) Continuation-in-part of application No. 09/894,668, filed on Jun. 27, 2001, and a continuation-in-part of application No. 09/901,318, filed on Jul. 9, 2001, now abandoned.

(60) Provisional application No. 60/220,722, filed on Jul. 26, 2000, provisional application No. 60/235,613, filed on Sep. 27, 2000, provisional application No. 60/277,782, filed on Mar. 21, 2001.

(51) Int. Cl.
*G11B 33/14* (2006.01)
*G11B 25/04* (2006.01)
*G11B 21/22* (2006.01)

(52) U.S. Cl. .............................. 360/97.02; 360/97.03; 360/254.7

(58) Field of Classification Search ............. 360/97.02, 360/97.01, 97.03, 97.04, 256.1, 264.4, 254.4, 360/254.3, 254.5, 254.6, 255.2, 255.3, 255.4, 360/255.5, 254.7
See application file for complete search history.

(56) References Cited

U.S. PATENT DOCUMENTS

| 4,647,997 A | 3/1987 | Westwood |
| 4,703,379 A | 10/1987 | Bogdanski |
| 5,031,059 A | 7/1991 | Yamaguchi et al. |
| 5,036,416 A | 7/1991 | Mastache |
| 5,134,530 A | 7/1992 | Hall |

(Continued)

FOREIGN PATENT DOCUMENTS

EP 0 450 184 A3 12/1990

*Primary Examiner*—Craig A. Renner
(74) *Attorney, Agent, or Firm*—Fellers, Snider, et al.

(57) ABSTRACT

A disc drive includes a base, at least one disc rotatably attached to the base, and an actuator assembly rotatably attached to base and supporting a slider and a transducer at a distal end thereof. The slider and transducer are positioned to be in transducing relation with respect to the disc. An air dam is positioned over the disc and near an arc through which the slider and transducer are rotated. The air dam is positioned so as to produce an area of high pressure substantially about an area including a portion of the arc through which the slider and transducer are rotated. Surfaces are aligned with and extend in a coplanar relationship with the disc to transfer an outwardly directed airflow away from the disc without impinging turbulent flow on or at the disc edge.

26 Claims, 10 Drawing Sheets

U.S. PATENT DOCUMENTS

| | | | |
|---|---|---|---|
| 5,140,578 A | * 8/1992 | Tohkairin | 360/97.02 |
| 5,274,519 A | * 12/1993 | Saito et al. | 360/97.01 |
| 5,898,545 A | 4/1999 | Schirle | |
| 6,031,690 A | 2/2000 | Kelemen et al. | |
| 6,091,570 A | 7/2000 | Hendriks | |
| 6,097,568 A | 8/2000 | Ekhoff | |

* cited by examiner

TWO-PART FLOW CONDITIONING APPARATUS FOR A DISC DRIVE

RELATED APPLICATIONS

This is a continuation-in-part application of the U.S. patent application Ser. No. 09/894,668 filed Jun. 27, 2001 which is based on the provisional application No. 60/220,722 filed Jul. 26, 2000, and is also a continuation-in-part of the U.S. patent application Ser. No. 09/901,318 filed Jul. 9, 2001 abandon which is based on the provisional application No. 60/235,613 filed Sep. 27, 2000 and the provisional application No. 60/277,782 filed Mar. 21, 2001.

FIELD OF THE INVENTION

The present invention relates generally to the field of data storage devices. More particularly, but not by way of limitation, this invention relates to an apparatus and method for controlling the aerodynamic excitation imparted to disc drive components by airstreams generated by spinning discs in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

The methods for positioning the transducers can generally be grouped into two categories. Disc drives with linear actuators move the transducer linearly generally along a radial line to position the transducers over the various tracks on the information storage disc. Disc drives also have rotary actuators which are mounted to the base of the disc drive for arcuate movement of the transducers across the tracks of the information storage disc. Rotary actuators position transducers by rotationally moving them to a specified location on an information recording disc. A rotary actuator positions the transducer quickly and precisely.

The actuator is rotatably attached to a shaft via a bearing cartridge which generally includes one or more sets of ball bearings. The shaft is attached to the base and may be attached to the top cover of the disc drive. A yoke is attached to the actuator and is positioned at one end of the actuator. The voice coil is attached to the yoke at one end of the rotary actuator. The voice coil is part of a voice coil motor which is used to rotate the actuator and the attached transducer or transducers. A set of permanent magnets is attached to the base and cover of the disc drive. The voice coil motor which drives the rotary actuator comprises the voice coil and the permanent magnet. The voice coil is attached to the rotary actuator and the permanent magnet is fixed on the base. A top plate and a bottom plate are generally used to attach the set of permanent magnets of the voice coil motor to the base. The top plate and the bottom plate also direct the flux of the set of permanent magnets. Since the voice coil sandwiched between the set of permanent magnets and top plate and bottom plate which produces a magnetic field, electricity can be applied to the voice coil to drive it so as to position the transducers at a target track.

One problem associated with disc drives is that the actuator assembly may resonate or vibrate at certain frequencies which in turn causes the transducer within the slider to move off-track. In other words, if there is even a slight vibration, the slider may move away from the center of a track during a track following operation. If the vibration is too large, the transducer continuously crosses the track to be followed and little if any information can be read. Writing can not be accomplished since there is a risk, at these times, that the transducer may be positioned over another adjacent track and attempting to write may result in overwriting other data that is necessary. The source of vibration may be the natural resonance of an actuator assembly or may be due to other influences. One of these influences is airflow generated by the rotating discs. The airflow generated by the rotating disc or discs (also referred to as windage) excites head suspensions which in turn cause the slider and transducers to vibrate. The vibration causes run-out which is off-track motion. Of course as the density of tracks is increased, run-out due to smaller vibrations becomes more critical.

What is needed is a disc drive that reduces vibration of the suspension and attached transducer and slider resulting from airflow between the spinning discs in a disc drive. What is also needed is a disc drive in which there is less off-track motion or run-out. There is a constant need for a disc drive which has additional capacity as well as increased reliability without an appreciable rise in the error rate. There is also a need for methods and apparatus to reduce vibrations in the suspension and attached slider and transducer.

SUMMARY OF THE INVENTION

Embodiments of the present invention are directed to providing an air stream conditioning apparatus for a disc drive for damping the aerodynamic excitation of an air stream or fluid flow on disc drive components. The disc drive typically has an enclosure supporting a rotating disc and moveably supporting an actuator having a distal end moving a data transfer element in a data transfer relationship with a data storage surface of the data disc. In one aspect of the present invention the flow conditioning apparatus comprises one or more first extensions pivotable with respect to one or more second extensions. The flow conditioning apparatus is supportable downstream of the actuator with respect to the flow currents. The flow conditioning apparatus provides a second extension extending substantially radially from an outer edge of the disc to an inner edge of the disc, adjacent the disc surface. Embodiments of the present invention provides for the flow conditioning apparatus to be changeable between a compact configuration and an operational configuration.

In another aspect of the invention, the flow conditioning apparatus includes a shroud surface substantially transverse to the disc surface, at a far side of the first extension. The first extension may include flat surfaces substantially coextensive with the disc surfaces, or may integrate ramps for lifting the sliders away from the disc surfaces.

Embodiments of the present invention provide for a way to reduce the pressure difference across the actuator and decelerate the fluid flow impinging on the actuaton. In addition, high frequency fluid flow disturbances can be redistributed outside the servo bandwidth where the servo capability of the disc drive is better equipped to effectively deal with the disturbance. The present invention therefore provides the advantage of reducing windage induced non-repeatable run-out.

These and various other features as well as advantages which characterize the present invention will be apparent upon reading of the following detailed description and review of the associated drawings.

DESCRIPTION OF THE PREFERRED EMBODIMENT

Figure 1:
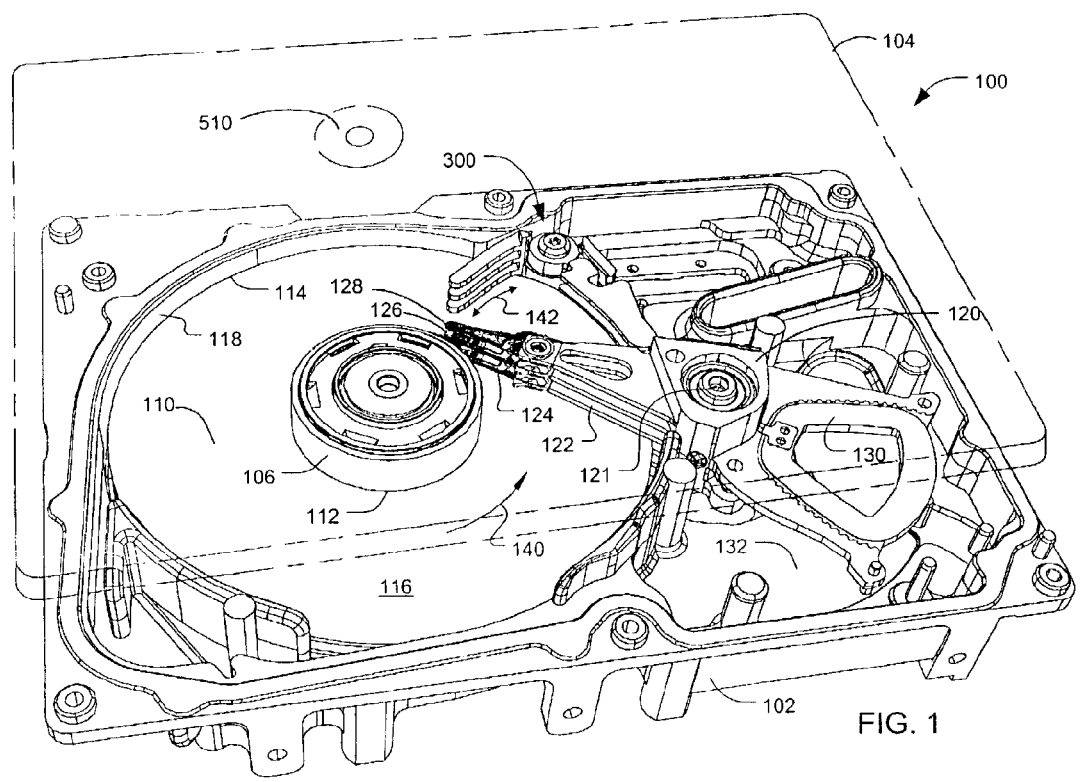
FIG. 1 is an isometric view of a disc drive in which several discs have been removed to show an actuator and a flow conditioning apparatus according to one embodiment of the present invention.

FIG. 1 is an isometric view of a disc drive 100 according to one embodiment of the present invention. The disc drive 100 includes a base plate or base 102, and a cover 104. The base 102 and cover 104 form a disc drive enclosure. Mounted to the base 102 is a spindle motor 106 to which several discs 110 are secured. Each disc 110 is generally annular in shape, with an inner edge 112 and an outer edge 114 circumscribing two opposing disc surfaces 116 (of which only one is visible in the drawing) to which data can be stored for later retrieval. The base 102 provides a cavity or room for the discs 110 to be seated in a substantially coaxial arrangement, with an inner wall 118 of the base running around the outer edges 114 of the discs 110, substantially transverse to the disc surfaces 116.

In the drawing, several of the discs 110 have been removed to provide a clearer illustration of an actuator assembly 120 that is pivotably mounted to the base. On one side of the pivot 121, the actuator assembly 120 includes a plurality of arms 122 to which are attached load beams or suspensions 124. At the end of each suspension 124 is a slider 126 that carries the read/write devices (designated generally by 128). The present invention is equally applicable to sliders having different types of read/write devices, such as what is generally referred to as transducers, magneto resistive heads or giant magneto resistive heads. On another side of the pivot, the actuator assembly 120 extends to support a voice coil 130 next to one or more magnets 132 fixed relative to the base 102. When energized, resultant electromagnetic forces on the voice coil 130 causes the actuator assembly 120 to rotate about the pivot 121, thereby bringing the read/write devices into various radial locations relative to the disc surfaces 116. It can be seen that, with the spindle motor 106 rotating the discs 110, for example, in a direction indicated by arrow 140, and the actuator assembly 120 moving the read/write heads 128 in an arcuate path, as indicated by arrow 142, across the disc surfaces 116, various locations on the disc surfaces 116 can be accessed by the read/write heads for data recordation or retrieval.

As the discs 110 are rotated, fluid or air adjacent to the disc surfaces 110 is also brought into motion, generating air streams or flow currents in the disc drive enclosure. A flow conditioning apparatus 300 is provided adjacent the discs 110 to modify or improve the flow behavior and characteristics of the flow currents, as well as to exploit the flow currents to improve the overall performance of the disc drive. The flow conditioning apparatus 300 includes a set of fins or first extensions 310 pivotable with respect to a set of vanes or second extensions 330.

Figure 2:
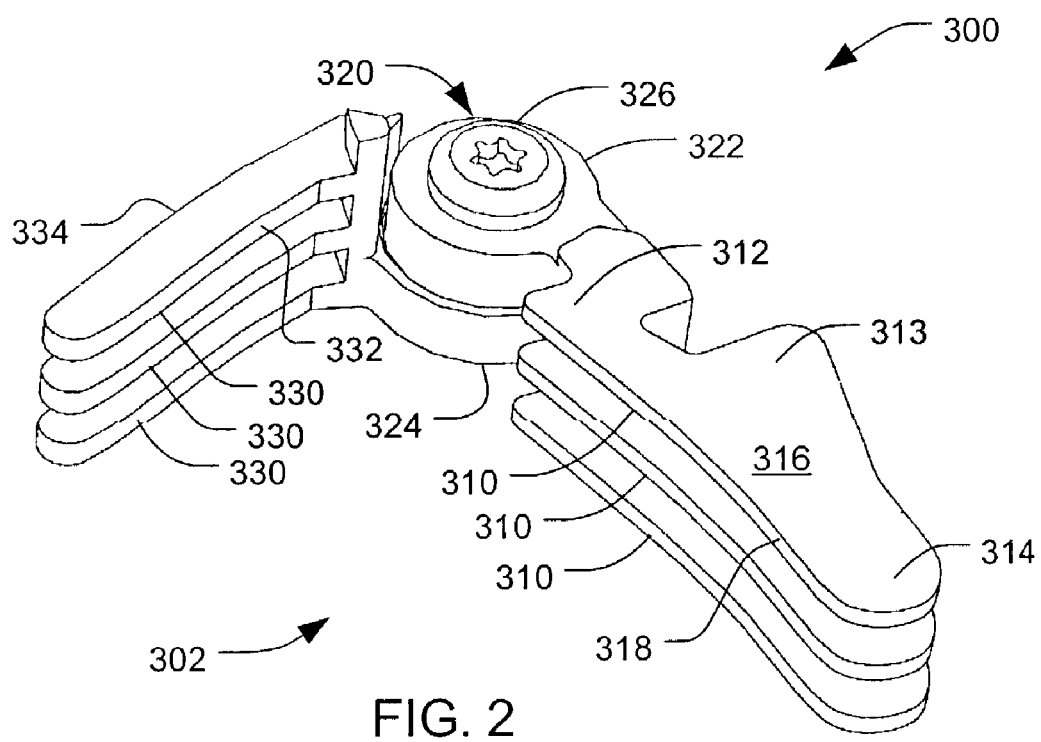
FIG. 2 is an isometric view of the flow conditioning apparatus in an unfolded or operational configuration.

Referring to FIG. 2, one embodiment of the flow conditioning apparatus 300 will be described in more detail. The flow conditioning apparatus 300 includes a set of first extensions 310, a pivot 320, and a set of second extensions 330. Each first extension 310 can be generally described as having a proximal end 312 and a distal end 314 relative to the pivot 320.

From the proximal end 312 to the distal end 314, the first extension 310 includes two opposing flat surfaces 316 (of which only one is visible in the drawing). The first extension 310 is configured such that, in assembly, the flat surfaces 316 are substantially parallel to the disc surfaces 116, as shown in FIG. 1. The first extension 310 has a near side 318 running substantially from the proximal end 312 to the distal end 314. In assembly, the near side 318 will be arranged next to the outer edge 114 of a disc 110. In this embodiment, the near side 318 is slightly curved to follow the curvature of the outer edge 114 of the disc 110. Optionally, as illustrated here, the flat surface 316 is of variable width along the length of the first extension 310, with an intermediate portion 313 that is wider than either the proximal end 312 or the distal end 314. The first extensions 310 are formed to be of fixed spatial relation to one another, and are unitary with a first joint portion 322. The first extensions 310 may have the same thickness or substantially the same thickness as the discs 110. The number of first extensions 310 in the flow conditioning apparatus 300 preferably equals the number of discs 110 in the disc drive 100. For example, if the disc drive configuration calls for only one disc 110, the flow conditioning apparatus 300 may be formed with only one first extension 310. The first extensions 310 change the boundary conditions at the outer edges 114 of the discs 110 when assembled in close proximity to the discs, and essentially reduce turbulent flow conditions at or off the outer edges 114 of the discs.

Continuing with FIG. 2, the flow conditioning apparatus includes a set of second extensions 330, each of which are in fixed spatial relation to one another, and are unitary with a second joint portion 324. In this particular embodiment, the first joint portion 322 is substantially annular in shape, and designed to be located co-axially with the second joint portion 324 which is also substantially annular in shape. A fastener 326 is threaded through the first joint portion 322 and the second joint portion 324 to provide the pivot 320. The fastener 322 may serve an additional function of engaging an appropriate receiver at the base 102, such as a threaded hole, and thereby be used for securing the flow conditioning apparatus 300 to the base 102. Variations to the pivot 320 may be made to allow for free, stepped or controlled rotation of the second extensions 330 relative to the first extensions 310.

FIG. 2 shows the flow conditioning apparatus 300 in an unfolded or operational configuration 302 where the second extensions 330 are angularly displaced from the first extensions 310. In one application, such as that shown in FIG. 1, while the first extensions 310 are located alongside the outer edges 114 of the discs 110 in a generally circumferential orientation, the second extensions 330 are directed in a generally radial orientation such that the second extensions 330 extend from the outer edges 114 toward the inner edges 112 of the discs. Alternatively, the second extensions 330 may be oriented such that the second extensions 330 and the first extensions 310 define an obtuse angle of displacement. In the operational configuration 302, the second extensions 330 may be positioned above the top-most disc 110 as well as between each of the discs 110. The number of second extensions 330 is generally one more than the number of discs 110 in the disc drive 100. Alternatively, the flow conditioning apparatus 300 may have only one second extension 330 that is adjacent the only disc surface 116 intended for data storage. The second extensions 330 are shaped to hinder flow currents that are generated by the spinning discs 110. Each second extension 330 therefore presents a leading side 332 to the on-coming flow currents, and a trailing side 334 (FIG. 2). Optionally, the leading side 332 may be a curved surface so that, in assembly, the slider 126 will be generally the same distance away from the leading side 332 for various radial positions of the slider 126. Alternatively, the leading side 332 may be a substantially planar surface so that the slider 126 will be nearer the leading side 332 the nearer the slider is to the outer edges 114 of the discs 110.

Figure 3:
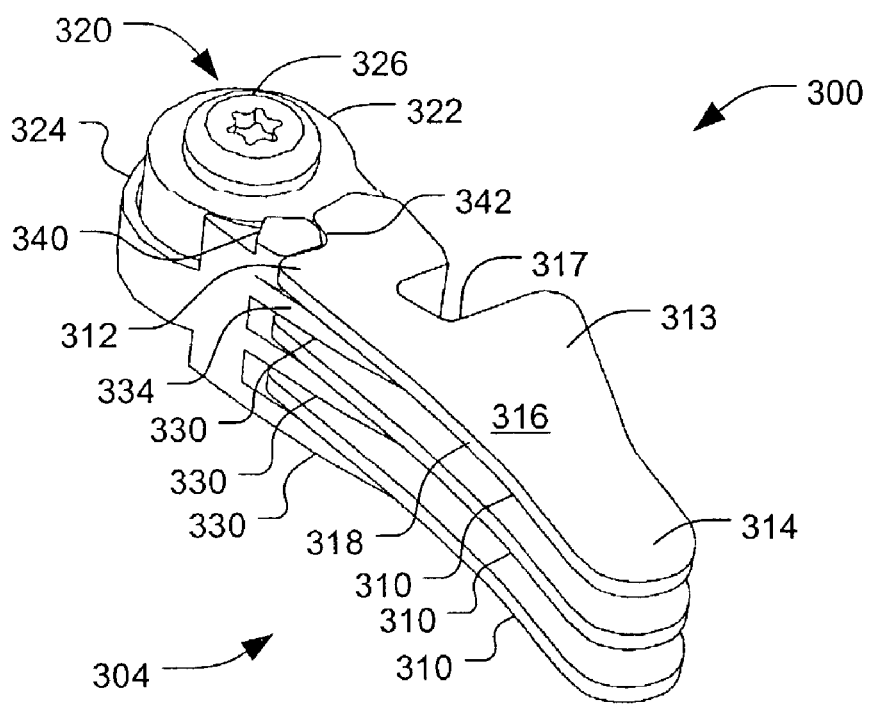
FIG. 3 is an isometric view of the flow conditioning apparatus in a folded or compact configuration.

FIG. 3 shows the flow conditioning apparatus 300 in a folded or compact configuration 304 where the second extensions 330 and the first extensions 310 are rotated relative to each other until a compact shape for the flow conditioning apparatus is achieved. In the compact configuration 304, the second extensions 330 and the first extensions 310 substantially overlap or are interleaved to form alternating layers of second extensions 330 and first extensions 310. Abutment features 340, 342 may be provided to limit the extent of rotation of the second extensions 330 relative to the first extensions 310. Features may be included to provide access to the second extensions 330 when the flow conditioning apparatus 300 is in the compact configuration 304 so as to facilitate the change from the compact configuration 304 to the operational configuration 302. In this example, the first extensions 310 are shaped with notches or cavities 317 that expose the second extensions 330. Alternatively, the top-most second extension 330 may be arranged above the top-most first extension 310, and can thus be easily accessed and pushed out from the compact configuration 304 to the operational configuration 302.

Without the made-for-manufacturing advantages provided by the present invention, it would have been more difficult to assemble a part or a sub-assembly that is intended to interleave the discs 110. More room on the base 102 would have been required, and greater care would have been required to ensure that the discs 110 are not injured in the course of assembly.

Figure 4:
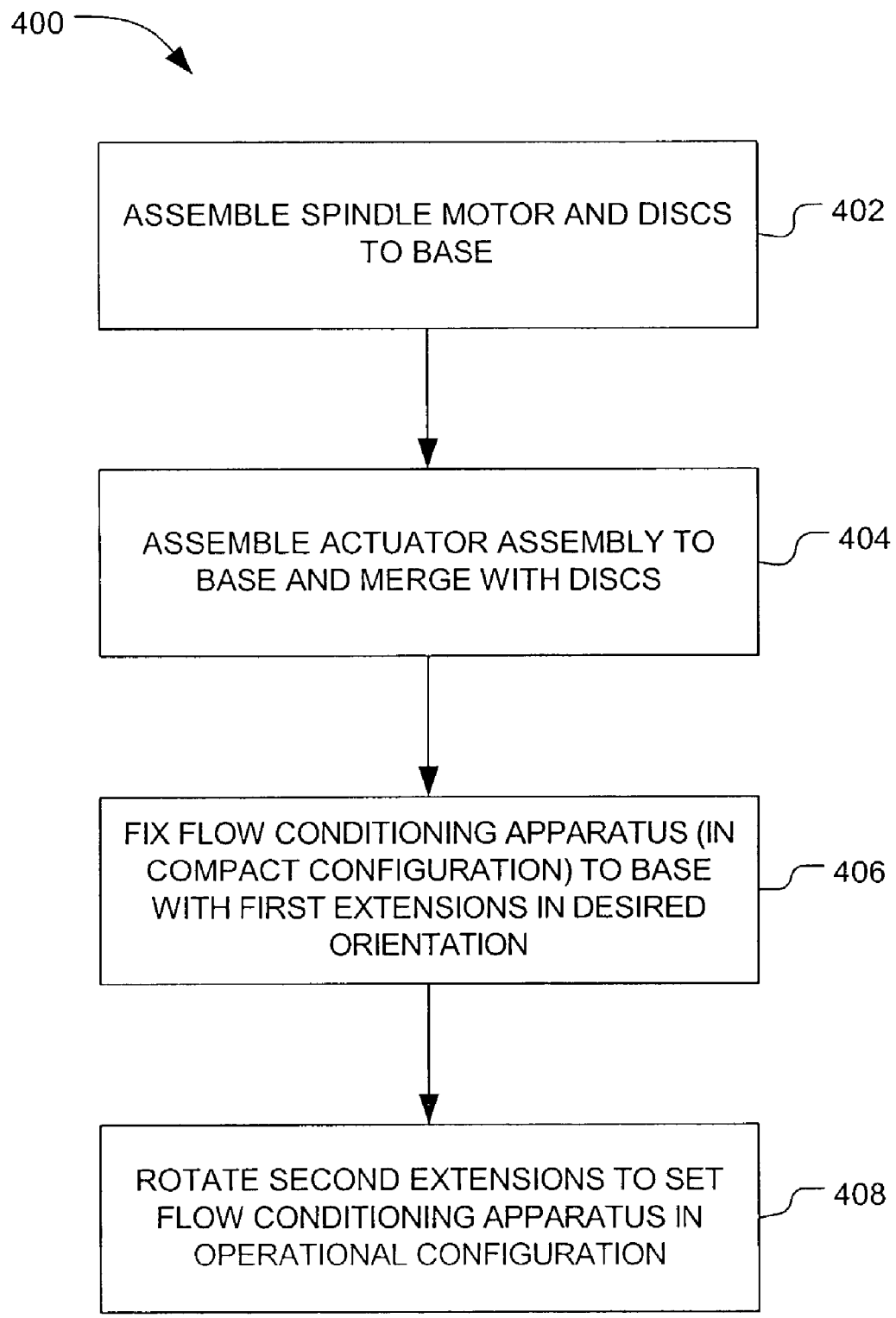
FIG. 4 is a flow chart showing a process for assembling the flow conditioning apparatus in a disc drive.

With the present invention, however, the compact configuration 304 allows the flow conditioning apparatus 300 to be more easily installed while demanding much less room for installation. In an exemplary assembly process 400 illustrated by the flow chart of FIG. 4, the spindle motor 106 and discs 110 are assembled with the base 102 of the disc drive 100 (step 402). The actuator assembly 120 is attached to the base 102 and merged with the discs 110, that is, the sliders 126 are brought towards the inner edges 112 of the discs 110 and parked at a landing zone 134 (step 404). The flow conditioning apparatus 300 in its compact configuration 304 is then attached to a base 102 such that the first extensions 310 are in a desired orientation (step 406). Next, the second extensions 330 are pivoted with respect to the first extensions 310 until the flow conditioning apparatus 300 is in a desired operational configuration 302 (step 408). Having a compact configuration 304 and an operational configuration 302 allows the flow conditioning apparatus 300 to be placed within the disc drive 100 with minimal change from current manufacturing practices. In addition to other advantages, the present invention reduces the likelihood of accidental damage to the discs 110 since each second extension 330 approaches the discs 110 only after it is at an elevation (with respect to the base 102) that is between discs, or above or below a disc. The present invention also facilitates automated assembly, which can be an important factor in overall cost efficiency in manufacture.

Figure 5:
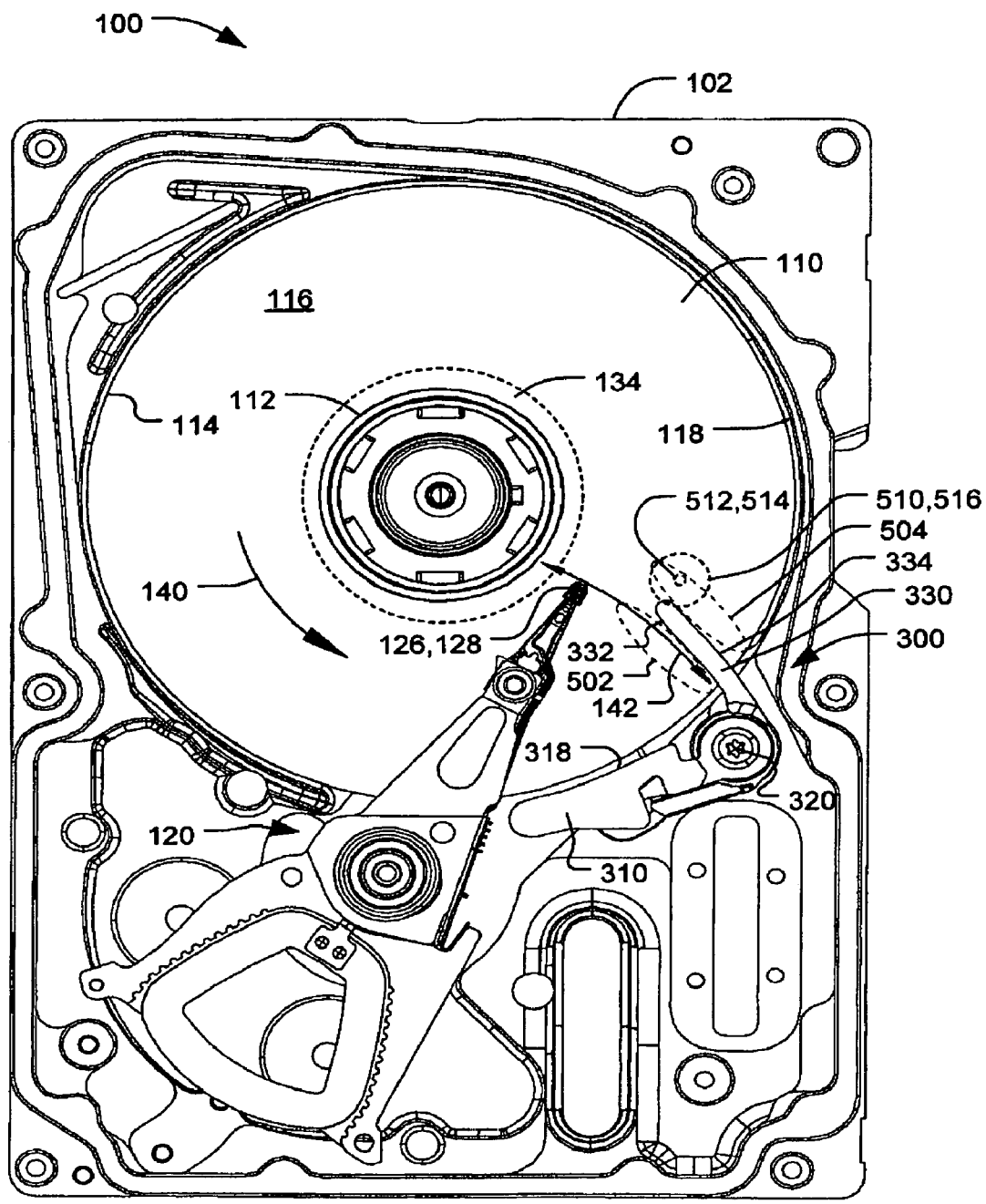
FIG. 5 is a top view of the disc drive of FIG. 1.

When the discs 110 are spinning, the flow conditioning apparatus 300 produces a high pressure region 502 next to the leading side 332 of the second extension 330, as schematically depicted in FIG. 5. On the trailing side 334 of the second extension 330, a low pressure region 504 will be developed as the result of the flow conditioning apparatus 300. The terms "high pressure" and "low pressure" are intended to be understood as being relative to the pressure in a similar system that does not use a flow conditioning apparatus 300 of the present invention. Further, the high pressure region 502 and the low pressure region 504 as drawn in FIG. 5 are merely rough schematics and intended to aid understanding of the present invention, and may differ for different embodiments of the present invention and for different disc drive configurations in which the embodiment is implemented.

Alternatively described, the velocity of flow currents is reduced when the flow currents come up against the leading side 332 of the second extensions 330. The second extensions 330 may be sized to substantially fill the space between adjacent discs 110. In such a fashion, the slider 126 with its associated read/write devices 128 can be made to operate in a high pressure region 502 created by the flow conditioning apparatus 300, and thus operate within a stable region that is less prone to vibration resulting from the flow currents. In addition, the velocity of flow currents within the disc drive 100 and away from the flow conditioning apparatus 300 may be reduced, thus stabilizing the slider 126 and the read/write devices 128. Another way to consider the effect of the flow conditioning apparatus 300 would be that there is less energy in the flow currents and therefore less energy to impart vibrations on various components of the disc drive 100. For example, torque disturbances on the actuator assembly 120 are reduced. Accordingly, the extent of vibration-induced run-out errors decreases, leading to an overall improved performance of the disc drive 100.

The present invention may be further exploited to create an environment favorable for efficient application of a breather filter 510. Air may sometimes enter a disc drive. Rather than have unfiltered air enter the disc drive 100 and contaminate its internal environment, a breather filter 510 is incorporated with the disc drive 100 so that any air that enters the disc drive 100 is first filtered. The present invention provides for known locations where low pressure regions 504 will develop, and thereby provide a desirable location for the breather filter such that any air that enters the disc drive 100 would tend to enter through the breather filter 510 instead of through other openings that may not provide for filtration. As shown FIG. 5, on the trailing sides 334 of the second extensions 330, low pressure regions 504 develop when the discs 110 are spinning. A breather filter 510 may be located so that its internal opening 512 opens to a low pressure region 504 that develops at the trailing side 334 of the second extension 330, as shown. Such a breather filter 510 may be located at the base 102 or at the cover 104 of the disc drive, and would include an external opening 514 with a filter 516 interposed between the internal opening 512 and the external opening 514. Alternatively, the external opening 514 and the internal opening 512 may be the same hole, and the filter 516 may be located to cover the internal opening 512, and thereby be in the position to filter any incoming air. Alternatively, the breather filter 510 may include an air channel 518 leading from the external opening 514 to the internal opening 512.

Figure 6:
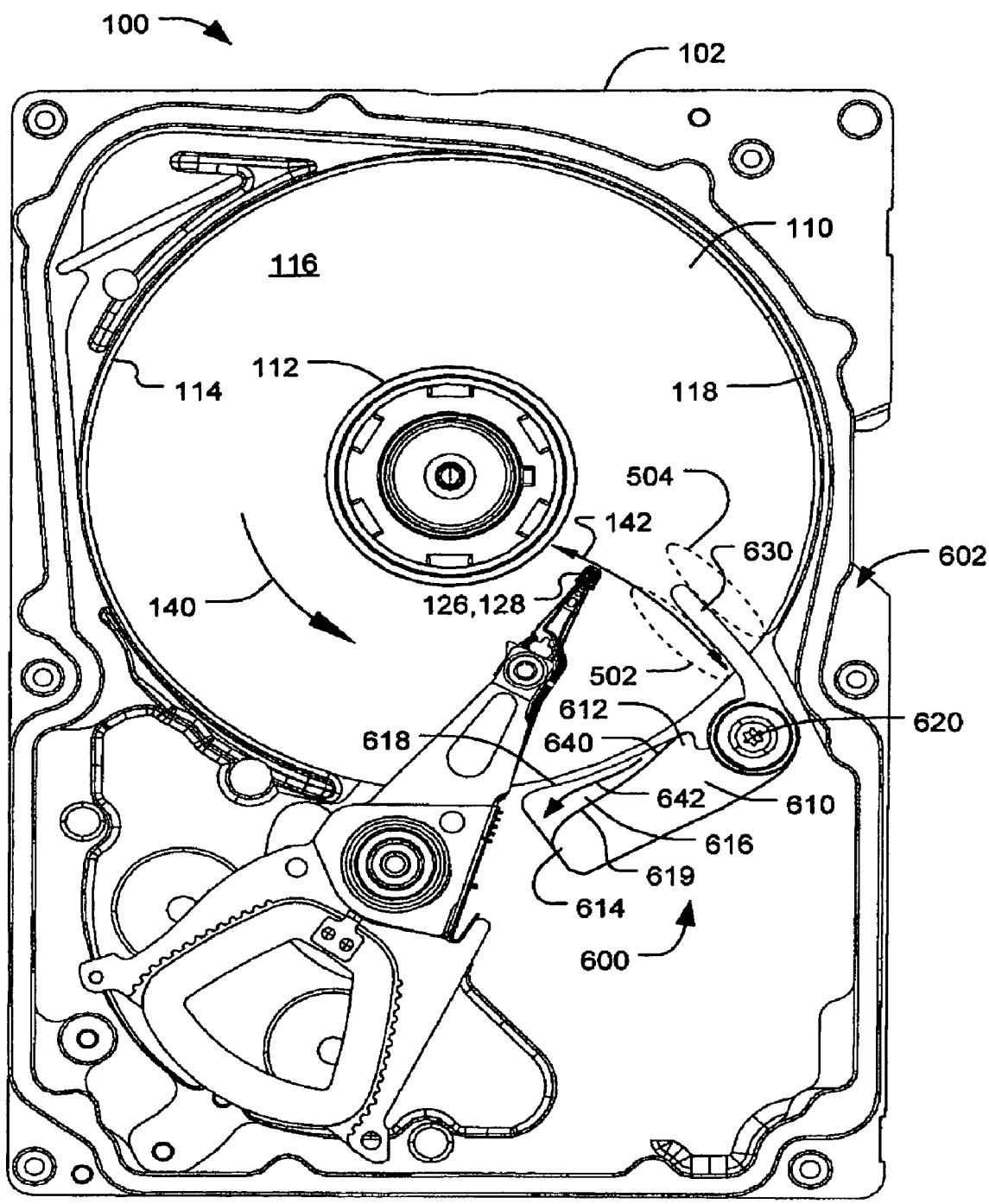
FIG. 6 is a top view of a disc drive with a flow conditioning apparatus having a shroud.

FIG. 6 is a top view of an alternative embodiment of the present invention, showing the flow conditioning apparatus having at least one shroud surface 640. As in the embodiment described above, the flow conditioning apparatus 600 includes one or more first extensions 610 pivotably connected to one or more second extensions 630. In an operational configuration 602, the second extensions 630 are angularly displaced from the first extensions 610. In a disc drive 100, the second extensions 630 are directed generally radially with respect to the discs while the first extensions are disposed to one side of the discs 110. The near side 618 of each first extension 610 is located next to the outer edges 114 of the discs 110. Stretching along the far side 619 of each first extensions is a shroud surface 640 that is disposed substantially transverse to the disc surfaces 116. The shroud surface 640 extends substantially from a proximal end 612 of the first extension 610 to a distal end 614 of the first extension 610. Between the near side 618 and the shroud surface 640, the first extension provides two opposing and substantially flat surfaces 616 that, optionally, gradually increases in width. In other words, the shroud surface 640 leads away from the near side 618 as it extends away the proximal end 612 towards the distal end 614. By closely fitting the shroud surface 640 to the outer edge 114 of the disc 110 at the proximal end 612, the flow currents are prevented from leaving the discs 110. By increasingly widening the width of the flat surfaces 616, the shroud 640 channels the flow currents away from the slider 126 and the read/write devices 128 before they are allowed to be expelled from the discs 110 in the direction indicated by arrow 642. The provision of the shroud 640 encourages laminar flow currents and reduces aerodynamic excitation from turbulent flow currents. Shrouding also minimizes the effects of shedding vortices at the outer edges 114 of the discs 110 that may produce axial forces on the discs 110. At the same time, shrouding reduces resistive drag on the spinning discs 110, and thus reduces the power required to maintain the discs 100 at a desired rotational speed.

The present invention may be implemented in a disc drive 100 where it is desired to provide as extensive a shroud as practicable around the discs 110. The flow conditioning apparatus 600 with the shroud 640 may therefore be used to reduce the opening in the main shroud (provided by the inner wall 118 of the base 102) so that the break in the overall shroud is just wide enough to provide minimal clearance for movement of the actuator assembly 120.

Figure 7:
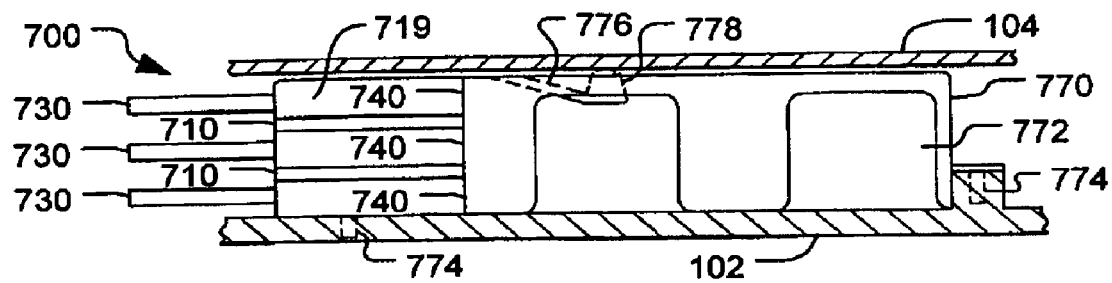
FIG. 7 is a side view of a flow conditioning apparatus according to another embodiment of the present invention.

In an alternative embodiment of the present invention, as shown in the elevation view of FIG. 7, the flow conditioning apparatus 700 includes second extensions 730 pivotally joined to first extensions 710, where the first extensions are supported by a frame 770. The frame 770 is formed at the far sides 719 of the first extensions 730 with one wall of the frame providing a shroud surface 740 along the far sides 719. The frame further provides a cavity within which a filter cartridge 772 may be received. Optionally, the frame may be provided with one or more locating tabs 774 for alignment with corresponding apertures in the base 102. A spring 776 cantilevered from the frame 770 has an enlarged portion 778 for pressingly engaging the cover 104 when the cover 104 is attached to the base 102. In such a manner, the flow conditioning apparatus 700 may be assembled in the disc drive 100 without the need for threaded fasteners, thereby improving the efficiency of the manufacturing process.

Figure 8:
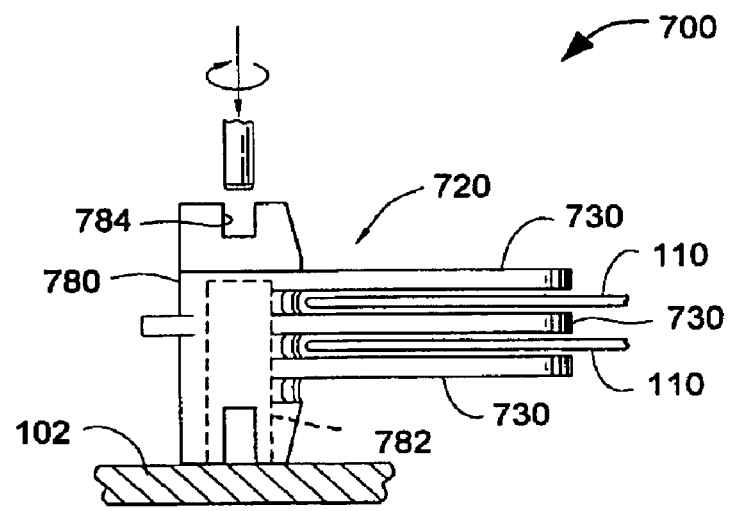
FIG. 8 illustrates a side view of the flow conditioning apparatus with an alternative mounting feature.

FIG. 8 illustrates a side view of the flow conditioning apparatus 700 with an alternative mounting feature. The pivot 720 that provide for rotation of the second extensions 730 relative to the first extensions 710 includes a shaft 780. The shaft 780 can be provided with a longitudinal opening that receives a boss 782 supported by or formed as part of the base 102. A tool feature 784 can be provided for releasably engaging an assembly tool for rotating the shaft 780 so that the flow conditioning apparatus 700, while assembled in its compact configuration, may be easily set into its operational configuration.

Figure 9:
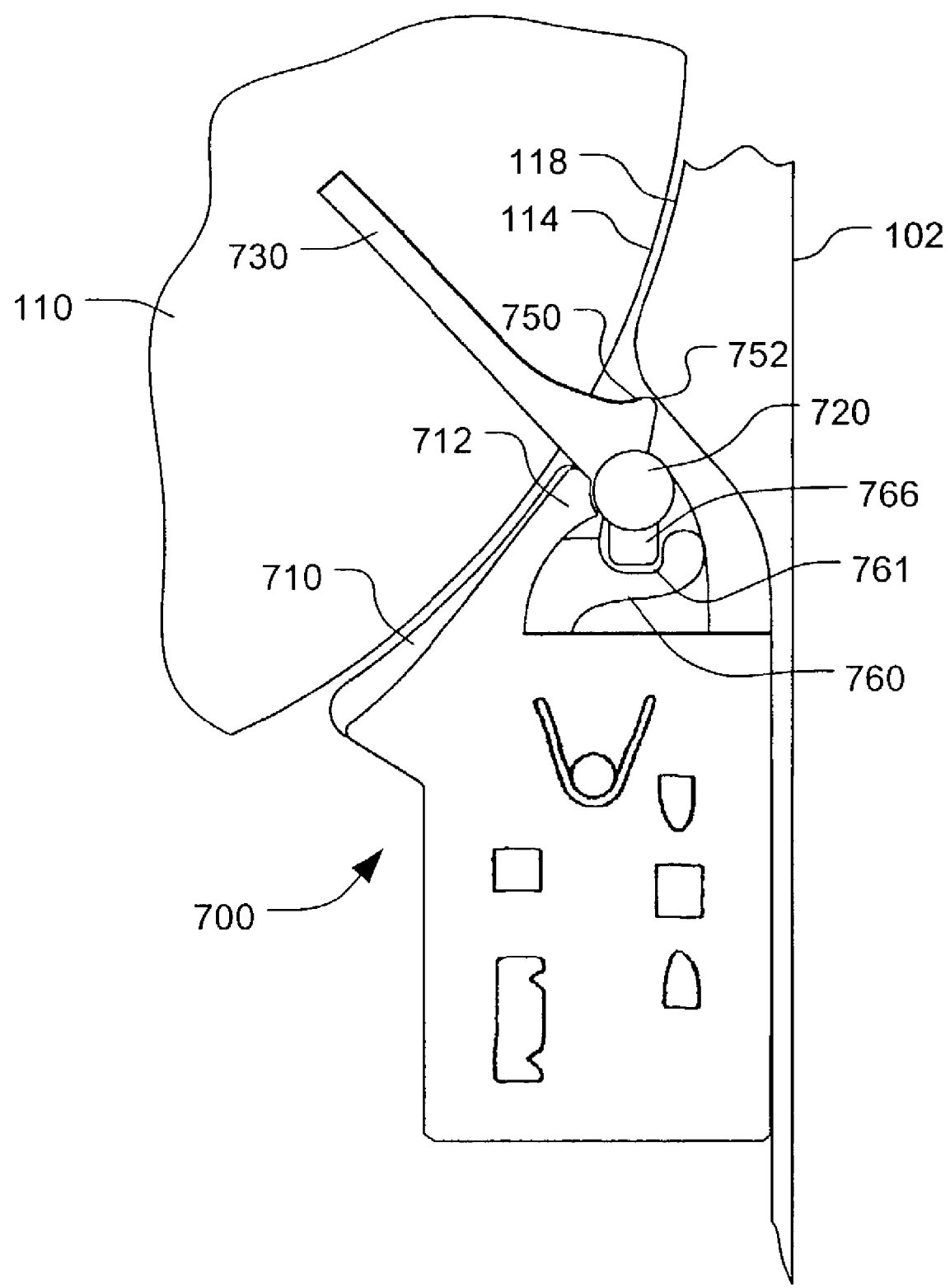
FIG. 9 is an enlarged view showing features for positively positioning the flow conditioning apparatus of FIG. 7 in the operational configuration.

A number of design-for-manufacturability features can be provided, for example, features that generally positively position the flow conditioning apparatus 700 in the compact configuration or in the operational configuration. FIG. 9 is an enlarged view of a flow conditioning apparatus 700 according to one embodiment of the present invention. The first extensions 710 and the second extensions 730 engage at a pivot 720. The second extensions 730 include an extending portion 750 that engages a selected portion 752 of the base 102 to prevent further rotation after the flow conditioning apparatus 700 has reached its operational configuration.

Another design-for-manufacturability feature provides for positively retaining the flow conditioning apparatus 700 in the operational configuration. In FIG. 9, for example, the flow conditioning apparatus 700 further includes an extending spring member 760. The spring member 760 is formed with a detent 761. The second extension 730 includes a tab 766 that is received within the detent 761 at the proximal end 712 of the first extension 710. Rotation of the second extensions 730 towards the operational configuration causes the tab 766 to engage and deflect the spring member 760. In the operational configuration, tab 766 is retained within the detent 761 as the spring member 760 returns to pressingly engage against the tab 766.

Figure 10:
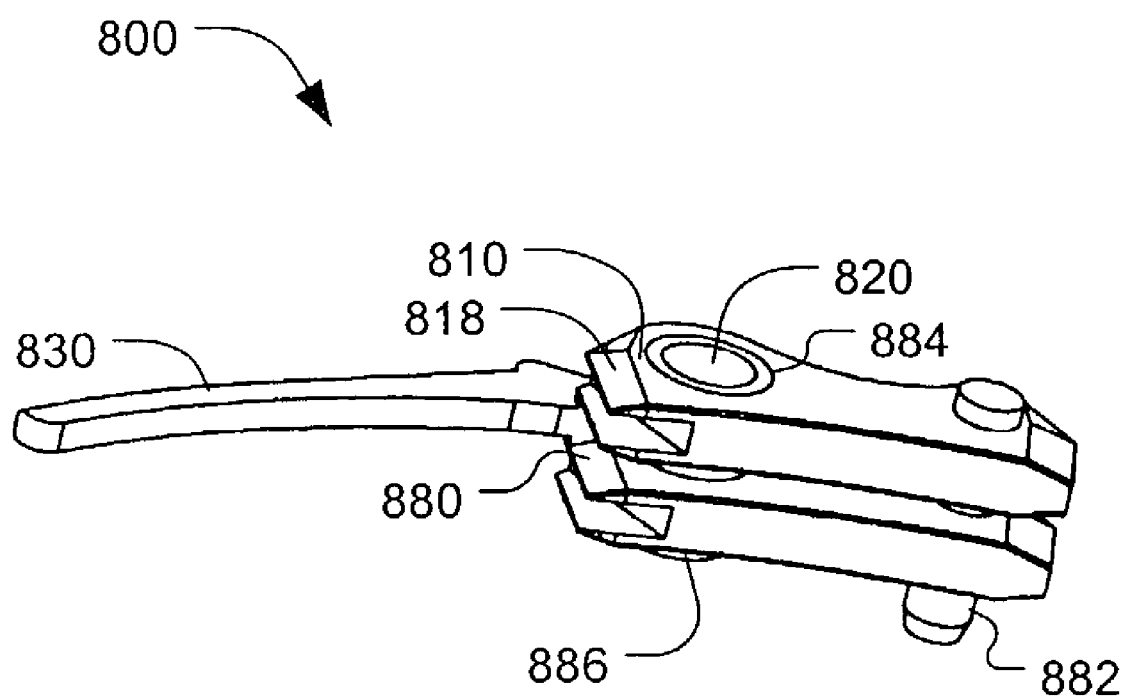
FIG. 10 is an isometric view of a flow conditioning apparatus with an integrated ramp.
Figure 11:
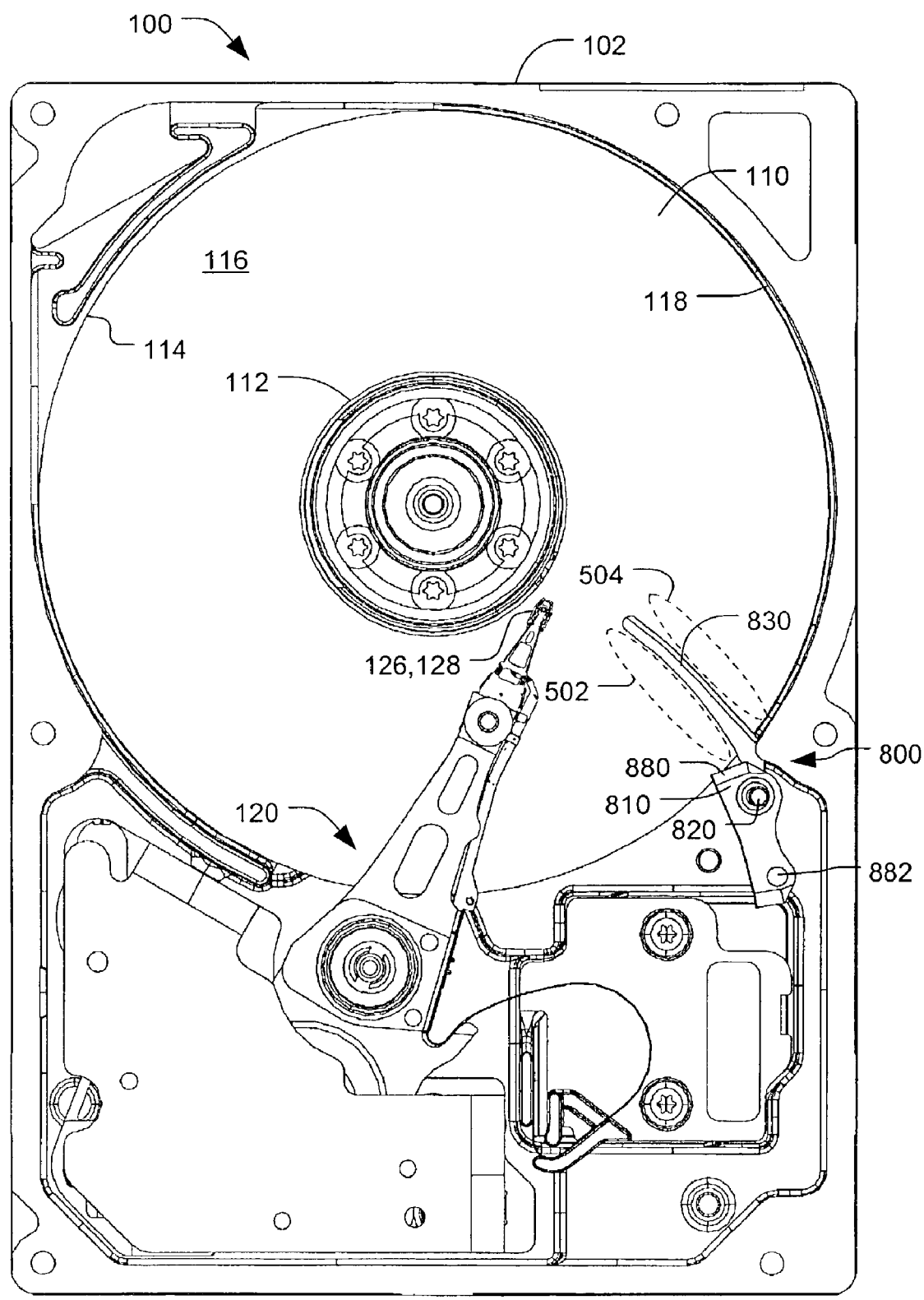
FIG. 11 is a top view showing the flow conditioning apparatus of FIG. 10 assembled in a disc drive.
Figure 12:
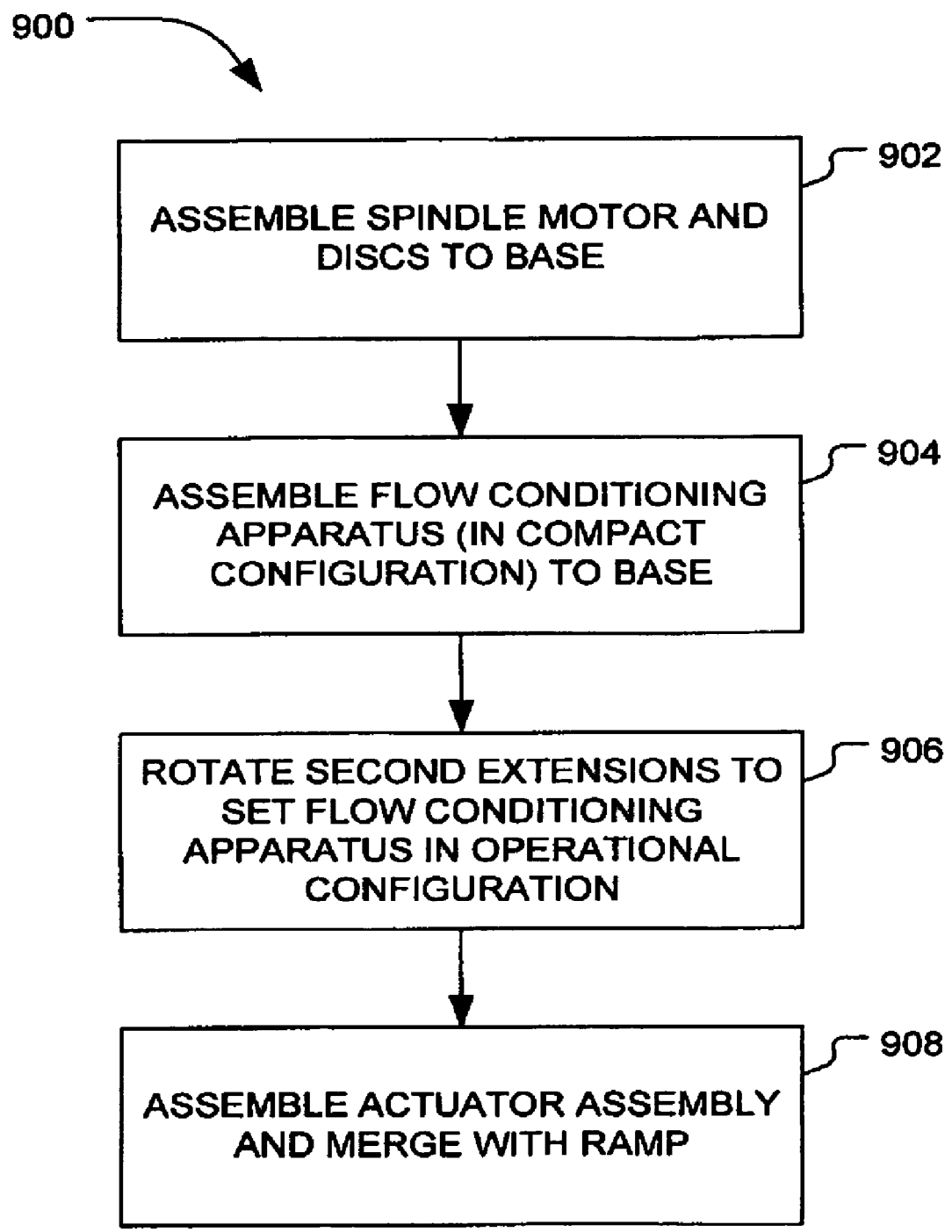
FIG. 12 is a flow chart illustrating a method of assembling the flow conditioning apparatus of FIG. 10 to a disc drive.

In yet another embodiment of the present invention, the flow conditioning apparatus 800 includes an integrated ramp 880, as shown in FIG. 10. The first extensions 810 include near sides 818 that are sloped away from the discs so as to facilitate the lifting of the slider 126 or of an extension from the suspension 124 or slider 126. The process 900 of assembling the flow conditioning apparatus 800 to the disc drive 100 such as that shown in FIG. 11 may be described with reference to the flow chart of FIG. 12. The flow conditioning apparatus 800 is mounted to the base 102, after which the spindle motor 106 and the discs 110 are assembled to the base 102 (steps 902, 904). The flow conditioning apparatus 800 is assembled in its compact configuration where the first extensions 810 and the second extensions 830 are substantially interleaved. The second extensions are rotated with respect to the base 102 such that they now interleave the discs 110 (step 906). The actuator assembly 120 is then mounted to the base 102 and merged with the ramp 880 (step 908). Alternatively, the order of assembling the flow conditioning apparatus 800, the spindle motor 106 with the discs 110 and the actuator assembly 120 may be rearranged. This flexibility is another advantage particularly beneficial to the design of manufacturing assembly lines provided by the present invention.

Referring again to FIG. 10, the flow conditioning apparatus 800 may alternatively include a post 882, a lower end of which is adapted to fit an opening in the base 102. The engagement between the post 882 and the base 102 may be such that the flow conditioning apparatus 800 is pivotable relative to the base 102. At the pivot 820 between the first extensions 810 and the second extensions 830, there may be provided an opening 884 for receiving a fastener 886. The fastener 886 engages the base 102 after passing through the opening 884, thereby securing the orientation of the first extensions 810 with respect to the base 102.

Alternatively described, one embodiment of the present invention provides a flow conditioning apparatus (such as 300, 600, 700, 800) for use in a disc drive (such as 100). The flow conditioning apparatus (such as 300, 600, 700, 800) has a first extension (such as 310, 610, 710, 810) defining a first plane and a second extension (such as 330, 630, 730, 830) pivotably connected to the first extension. The second extension (such as 330, 630, 730, 830) is rotatable about an axis (such as 320, 620, 720, 820), in a second plane that is substantially parallel to the first plane.

According to one embodiment, the flow conditioning apparatus (such as 300, 600, 700, 800) may have a plurality of the first extensions (such as 310, 610, 710, 810) interleaved with a plurality of the second extensions (such as 330, 630, 730, 830) along the axis. The second extensions (such as 330, 630, 730, 830) may fit between the respective first extensions (such as 310, 610, 710, 810) when the flow conditioning apparatus (such as 300, 600, 700, 800) is in a folded configuration, and be positioned away from the first extensions (such as 310, 610, 710, 810) when the flow conditioning apparatus (such as 300, 600, 700, 800) is in an operational configuration (such as 302). There may be a lock to bias the second extensions (such as 330, 630, 730, 830) against the first extensions such that the flow conditioning apparatus (such as 300, 600, 700, 800) is retained in the operational configuration (such as 302). Optionally, the second extension may have an arcuate edge (such as 332).

In another embodiment, the flow conditioning apparatus (such as 600) may include a shroud (such as 640) that defines a plane substantially transverse to the first plane, with the shroud (such as 640) running substantially from a proximal end (such as 612) of the first extension (such as 610) to a distal end (such as 614) of the first extension (such as 610). Optionally, the first extension (such as 610) is wider at the distal end (614) than at the proximal end (such as 612).

In yet another embodiment, the flow conditioning apparatus (such as 800) may further incorporate a ramp (such as 880).

According to one embodiment of the present invention, there is provided a disc drive (such as 100) having a disc (such as 110) configured for rotation such that fluid flow is generated by the disc (such as 110) when in rotation, an actuator (such as 120) adjacent the disc (such as 110), and a flow conditioning apparatus (such as 300, 600, 700, 800) located adjacent the disc (such as 110). The flow conditioning apparatus (such as 300, 600, 700, 800) may be described as having a first extension (such as 310, 610, 710, 810) defining a first plane and a second extension (such as 330, 630, 730, 830) that is pivotably connected to the first extension (such as 310, 610, 710, 810) for rotational movement about an axis (such as 320, 620, 720, 820). The second extension (such as 330, 630, 730, 830) is configured to be rotatable in a second plane that is substantially parallel to the first plane. In the disc drive (such as 100), the second extension (such as 330, 630, 730, 830) may be located downstream of the actuator (such as 120) with respect to the fluid flow.

The disc drive (such as 100) may include a flow conditioning apparatus (such as 300, 600, 700, 800) where the second extension (such as 330, 630, 730, 830) extends substantially radially from an outer radial portion (such as 114) of the disc (such as 110) to an inner radial portion (such as 112) of the disc (such as 110). Optionally, the second extension (such as 330, 630, 730, 830) is disposed substantially transverse to a distal end (such as 126) of the actuator (such as 120). Optionally, the second extension (such as 330, 630, 730, 830) has an arcuate leading edge (such as 332) disposed in proximity to a distal end (such as 126) of the actuator (such as 120).

In another embodiment, the disc drive (such as 100) is such that the first extension (such as 310, 610, 710, 810)

extends along an outer edge (such as 114) of the disc (such as 110) in proximity to the outer edge (such as 114).

Optionally, the first extension (such as 310, 610, 710, 810) is substantially coplanar with the disc (such as 110). The disc (such as 110) may be described as including opposing disc surfaces (such as 116), and the first extension (such as 310, 610) may have opposing extension surfaces (such as 316, 616) substantially coextensive with respective disc surfaces (such as 116).

In yet another embodiment, the disc drive (such as 100) includes a plurality of the disc (such as 110) and a plurality of the second extension (such as 330, 630, 730, 830). In an operational configuration (such as 302), the second extensions (such as 330, 630, 730, 830) interleave the discs (such as 110). In a compact configuration (such as 304), the second extensions (such as 330, 630, 730, 830) may interleave the first extensions (such as 310, 610, 710, 810). Optionally, the second extensions (such as 330, 630, 730, 830) fit between the respective first extensions (such as 310, 610, 710, 810) when the flow conditioning apparatus (such as 300, 600, 700, 800) is in a compact configuration (such as 304), and are positioned away from the first extensions (such as 310, 610, 710, 810) when the flow conditioning apparatus (such as 300, 600, 700, 800) is in an operational configuration (such as 302). The disc drive (such as 100) may further include a lock (such as 750, 752, 760, 761, 766, 884, 886) to bias the second extensions (such as 330, 630, 730, 830) against the first extensions (such as 310, 610, 710, 810) such that the flow conditioning apparatus (such as 300, 600, 700, 800) is retained in the operational configuration (such as 302).

The disc drive (such as 100) may include a flow conditioning apparatus (such as 300, 600, 700, 800) that further has a shroud (such as 640) defining a plane substantially transverse to the first plane, with the shroud (such as 640) running substantially from a proximal end (such as 612) of the first extension (such as 610) to a distal end (such as 614) of the first extension (such as 610). The shroud (such as 640) may be nearer the disc (such as 110) at the proximal end (such as 612) than at the distal end (such as 614).

Optionally, the disc drive (such as 100) includes a flow conditioning apparatus (such as 800) of which the first extension (such as 810) further incorporates a ramp (such as 880) adapted to receive a distal end (such as 126) of the actuator (such as 120).

In yet another embodiment, the disc drive (such as 100) may include a flow conditioning apparatus (such as 700) that further has a filter housing (such as 770) connected to the first extension (such as 710).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the size and placement of the flow conditioning apparatus may vary while maintaining substantially the same functionality without departing from the scope and spirit of the present invention. In addition, although the embodiments described herein are directed to an apparatus for use in a disc drive, it will be appreciated by those skilled in the art that the teachings of the present invention can be applied to other systems, like data storage test or certification systems, servo track writers, or optical data storage systems, without departing from the scope and spirit of the present invention.

What is claimed is:

1. A flow conditioning apparatus for use in a disc drive comprising:
    a plurality of a first extension defining a first plane; and
    a plurality of a second extension pivotably connected to the first extension for rotational movement about an axis, the second extension being rotatable in a second plane that is substantially parallel tote first plane, wherein the first extensions and the second extensions are interleaved along the axis.

2. The flow conditioning apparatus of claim 1 in which the second extensions fit between the respective first extensions when the flow conditioning apparatus is in a folded configuration, and in which the second extensions are positioned away from the first extensions when the flow conditioning apparatus is in an operational configuration.

3. The flow conditioning apparatus of claim 2 further comprising a lock to bias the second extensions against the first extensions such that the flow conditioning apparatus is retained in the operational configuration.

4. The flow conditioning apparatus of claim 1 in which the second extensions have an arcuate edge.

5. The flow conditioning apparatus of claim 1 in which the first extension includes a proximal end and a distal end, the flow conditioning apparatus further comprising a shroud defining a plane substantially transverse to the first plane, in which the sbroud runs substantially from the proximal end to the distal end.

6. The flow conditioning apparatus of claim 5 in which the first extension is wider at the distal end than at the proximal end.

7. The flow conditioning apparatus of claim 1 in which the first extension further comprises a ramp.

8. A disc drive comprising:
    a disc configured for rotation such that a fluid flow is generated by the disc when in rotation;
    an actuator adjacent the disc; and
    a flow conditioning apparatus located adjacent the disc, the flow conditioning apparatus comprising:
        a first extension comprising a side aligned with the disc and opposing surfaces extending immediately from the side in a direction away from the disc defining a first plane disposed in a coplanar relationship with the disc; and
        a second extension pivotably connected to the first extension for rotational movement about an axis, the second extension being rotatable in a second plane that is substantially parallel to the first plane, wherein the second extension is downstream of the actuator with respect to the fluid flow.

9. The disc drive of claim 8 in which the second extension extends substantially radially from an outer radial portion of the disc to an inner radial portion of the disc.

10. The disc drive of claim 9 in which the second extension is disposed substantially transverse to a distal end of the actuator.

11. The disc drive of claim 9 in which the second extension has an arcuate leading edge, wherein the arcuate leading edge is disposed in proximity to a distal end of the actuator.

12. The disc drive of claim 8 in which the first extension extends arcuately along an outer edge of the disc in proximity to the outer edge.

13. The disc drive of claim 8 in which the first extension opposing surfaces are substantially coextensive with respective disc surfaces.

14. The disc drive of claim 8 further comprising:
a plurality of the disc; and
a plurality of the second extension wherein, in an operational configuration, the second extensions interleave the discs.

15. The disc drive of claim 14 further comprising a plurality of the first extension in which, in a folded configuration, the second extensions interleave the first extensions.

16. The disc drive of claim 15 in which the second extensions fit between the respective first extensions when the flow conditioning apparatus is in a folded configuration, and in which the second extensions are positioned away from the first extensions when the flow conditioning apparatus is in an operational configuration.

17. The disc drive of claim 16 further comprising a lock to bias the second extensions against the first extensions such that the flow conditioning apparatus is retained in the operational configuration.

18. The disc drive of claim 8 in which the first extension includes a proximal end and a distal end, the flow conditioning apparatus further comprising a shroud defining a plane substantially transverse to the first plane, in which the shroud runs substantially from the proximal end to the distal end.

19. The disc drive of claim 18 in which the shroud is nearer the disc at the proximal end than at the distal end.

20. The disc drive of claim 8 in which the first extension further comprises a ramp adapted to receive a distal end of the actuator.

21. The disc drive of claim 8 in which the flow conditioning apparatus further comprises a filter housing connected to the first extension.

22. A disc drive comprising:
at least one disc;
read/write devices supportable in proximity to the at least one disc; and
means for conditioning air flow around the read/write devices in which the air flow is generated by the at least one disc in rotation.

23. The disc drive of claim 22 in which the means for conditioning air flow is located downstream of the read/write devices with respect to the air flow.

24. The disc drive of claim 22 in which the means for conditioning air flow is operable between an installation configuration and an operational configuration.

25. The disc drive of claim 24 in which the means for conditioning air flow occupies a smaller volume of space when in the installation configuration than in the operational configuration.

26. A flow conditioning apparatus comprising proximally hinged first and second extensions that arc moveable between an unfolded configuration where the extensions are distally separated and a folded configuration where the extensions are distally interleaved, wherein the apparatus is configured to align the first extensions with a like number of data storage mediums in the folded configuration and to move the second extensions to the unfolded configuration to interleave the second extensions with the data storage mediums.

* * * * *

UNITED STATES PATENT AND TRADEMARK OFFICE
CERTIFICATE OF CORRECTION

PATENT NO. : 6,987,640 B2
DATED : January 17, 2006
INVENTOR(S) : Alan Hing-Bun Tsang et al.

It is certified that error appears in the above-identified patent and that said Letters Patent is hereby corrected as shown below:

<u>Column 14,</u>
Line 22, replace "that arc" with -- that are --.

Signed and Sealed this

Twenty-third Day of May, 2006

JON W. DUDAS
*Director of the United States Patent and Trademark Office*